(12) United States Patent
Mikhailov et al.

(10) Patent No.: US 6,728,040 B1
(45) Date of Patent: Apr. 27, 2004

(54) IMAGING SYSTEM

(75) Inventors: Alexei Mikhailov, Dortmund (DE); Dirk Hauschild, Dortmund (DE)

(73) Assignee: Hentze-Lissotschenko Patentverwaltungs GmbH & Co. KG, Norderfriedrichskoog (DE)

(*) Notice: Subject to any disclaimer, the term of this patent is extended or adjusted under 35 U.S.C. 154(b) by 87 days.

(21) Appl. No.: 10/030,085

(22) PCT Filed: Jun. 27, 2000

(86) PCT No.: PCT/EP00/05935
§ 371 (c)(1),
(2), (4) Date: Mar. 5, 2002

(87) PCT Pub. No.: WO01/04681
PCT Pub. Date: Jan. 18, 2001

(30) Foreign Application Priority Data

Jul. 13, 1999 (DE) .......................... 199 32 592

(51) Int. Cl.[7] .............................. G02B 27/10
(52) U.S. Cl. ....................... 359/622; 359/621
(58) Field of Search ............. 359/621, 622, 359/623, 624

(56) References Cited

U.S. PATENT DOCUMENTS

| | | | |
|---|---|---|---|
| 2,303,113 A | 11/1942 | Eckel | 359/542 |
| 3,822,932 A | 7/1974 | Humphrey | 351/222 |
| 4,306,278 A | 12/1981 | Fulton et al. | 362/259 |
| 4,415,239 A | 11/1983 | Humphrey | 359/710 |
| 4,530,574 A | 7/1985 | Scifres et al. | 359/668 |
| 4,736,225 A | 4/1988 | Tanaka et al. | 355/1 |
| 5,353,150 A | 10/1994 | Mangir et al. | 359/338 |
| 5,355,388 A | 10/1994 | Lang | 372/99 |
| 5,517,359 A | 5/1996 | Gelbart | 359/623 |
| 5,581,414 A | 12/1996 | Snyder | 359/819 |
| 5,592,332 A | 1/1997 | Nishio et al. | 359/619 |
| 5,592,333 A | 1/1997 | Lewis | 359/628 |
| 5,636,059 A | 6/1997 | Snyder | 359/668 |
| 5,844,723 A | 12/1998 | Snyder | 359/668 |

FOREIGN PATENT DOCUMENTS

| | | |
|---|---|---|
| EP | 0367032 | 5/1990 |
| GB | 2220501 | 1/1990 |
| JP | 53 127722 | 11/1978 |

*Primary Examiner*—David N. Spector
(74) *Attorney, Agent, or Firm*—Hoffman, Wasson & Gitler, P.C.

(57) ABSTRACT

An imaging system, especially an imaging system for imaging electromagnetic radiation in the optical spectral range, includes at least one lens element and at least one first and one second optically functional boundary surface through which the electromagnetic radiation can pass. At least the first and at least the second optically functional interface can be located either on one or on two or more lens elements. At least the first and at least the second optically functional interface have, at least in sections, a cylinder lens geometry or a cylinder lens-like geometry so that these optically functional interfaces each have a direction lying in the interfaces and along which at least in sections the curvature of the surface is essentially constant. The direction of essentially constant curvature of at least the first optically functional interface to the direction of essentially constant curvature of at least the second optically functional interface being aligned roughly perpendicular to one another.

15 Claims, 2 Drawing Sheets

IMAGING SYSTEM

BACKGROUND OF THE INVENTION

This invention relates to an imaging system, especially an imaging system for imaging electromagnetic radiation in the optical spectral range. The imaging system includes at least one lens element and at least one first and one second optically functional boundary surface through which the electromagnetic radiation can pass. At least the first and second optically functional interfaces can be located either on one or more lens elements. At least the first and second optically functional interfaces have at least, in sections, a cylinder lens geometry or a cylinder lens-like geometry so that these optically functional interfaces each have a direction which lies in the interfaces and along which at least in sections the curvature of the surface is essentially constant. The direction of essentially constant curvature of the at least one first optically functional interface to the direction of essentially constant curvature of the at least the second optically functional interface being aligned roughly perpendicular to one another.

An imaging system of the aforementioned type is known from U.S. Pat. No. 5,844,723. The imaging system described therein is used for focusing the light emerging from the laser diode onto the entry surface of the optical fiber. To do this two cylinder lenses are used with cylinder axes which are perpendicular to one another. The disadvantage in this system is that imaging errors occur because the two cylinder lenses which are crossed to one another cannot be compensated.

The object of this invention is to devise an imaging system of the above-mentioned type in which imaging errors can be largely avoided.

This object is achieved by the features of the invention. It is provided that at least the first and/or at least the second optically functional interface have an aspherical cylinder lens geometry or an aspherical cylinder lens-like geometry. The aspherical cylinder lens geometry can be formed, for example, by an elliptical, hyperbolic or parabolic cylinder section. By choosing the aspherical cylinder lens geometries for the optically functional interfaces of the lens elements, the difference of optical path lengths of the electromagnetic radiation passing through the imaging system is minimized so that planar wave fronts are present after passing through the imaging system.

SUMMARY OF THE INVENTION

Imaging systems as depicted in the invention can be used for the entire optical spectral range from the vacuum-UV range into the far infrared range. It is also conceivable in the invention to use imaging systems in the x-ray range as long as the imaging takes place by refractive optically active interfaces.

It is possible in the invention for there to be at least two lens elements, on one of the lens elements there being the first optically functional interface and on the other of the lens elements the second optically functional interface. It is also possible to provide each of the lens elements with two optically functional interfaces. Then, for example, for each of the lens elements the optically functional interfaces opposite one another have cylinder lens geometries with directions of essentially constant curvature, i.e. with cylinder axes which are perpendicular. Alternatively, it is possible to make each of the lens elements such that there are one first or second optically functional interface and one planar inlet and outlet surface opposite it at a time.

In addition or alternatively to the embodiment of the cylinder lens geometries of the first and the second optically active interface as aspherical cylinder geometries, there is the possibility of providing an additional correction element with at least a third optically functional interface which likewise has at least in sections a cylinder lens geometry or cylinder lens-like geometry. This interface has a direction which lies in the surface along which, at least in sections, the curvature of the surface is essentially constant. By means of this additional correction element imaging errors can be eliminated so that the corresponding wave fronts of the electromagnetic radiation passing through the imaging system are corrected or converted into planar wave fronts.

According to one preferred embodiment of this invention, the direction of essentially constant curvature of at least the third optically functional interface is aligned at an angle of roughly 45° to the directions of essentially constant curvature of at least the first and at least the second optically functional interfaces. In this alignment of at least the third optically functional interface of the correction element, the imaging errors which are produced by the first and second optically functional interfaces, which are for example perpendicular to one another and which are provided with a spherical cylinder geometry, can be for the most part corrected. Advantageously, it can be provided that the correction element has two third optically functional interfaces opposite one another with directions of essentially constant curvature perpendicular to one another and are aligned preferably at an angle of roughly 45° to the direction of essentially constant curvature of the first and the second optically functional interfaces. Here the third optically functional interfaces can be made concave.

As depicted in the invention it is possible to provide at least the third optically functional interface with a spherical or an aspherical cylinder lens geometry. Especially for an aspherical cylinder lens geometry of at least the third optically functional interface of the correction element can the imaging errors caused by the two lens elements be optimally corrected. The aspherical cylinder lens geometry can in turn be formed for example by an elliptical, hyperbolic or parabolic cylinder lens section.

It is possible to arrange the two lens elements and especially in addition the correction element on a common carrier. One such compact embodiment of the imaging system can be used, for example, to focus the light emerging from a laser diode onto the entry surface of an optical fiber.

It is also possible to use the imaging system, for example, in the form of an imaging system housed on a common carrier as a micro objective lens which can be designed to have a very wide angle.

In objective lenses with a very wide angle under certain circumstances, as a result of the correction of imaging errors which is very effective as in the invention, angles of more than 90° can be achieved with relatively good quality.

Here, under certain circumstances it can be especially advantageous, instead of lens elements, to use arrays or linear lines of identical lens elements. In addition, instead of correction elements, arrays or linear lines of identical correction elements can be used. Here it is especially advantageous that by using cylinder lenses or cylinder lens-like geometries, rectangular or square lens elements and correction elements can be used so that arrays or linear lines of lens elements or correction elements with much better space utilization or with maximum attainable packing density can be prepared. These linear lines or two-dimensional arrays of lens elements and optically correction elements can be used for CCD cameras or CMOS cameras. It is also possible to use these imaging systems for process observation, for example for observation of welding processes.

BRIEF DESCRIPTION OF THE FIGURES

Other advantages and features of this invention become apparent from the following description of preferred embodiments with reference to the attached figures:

FIG. 1b shows a plan view of the imaging system as shown in FIG. 1a;

FIG. 1c shows a view along arrow 1c in FIG. 1a;

FIG. 3b shows a plan view of the imaging system as shown in FIG. 3a.

DETAILED DESCRIPTION OF THE INVENTION

Figure 1A:
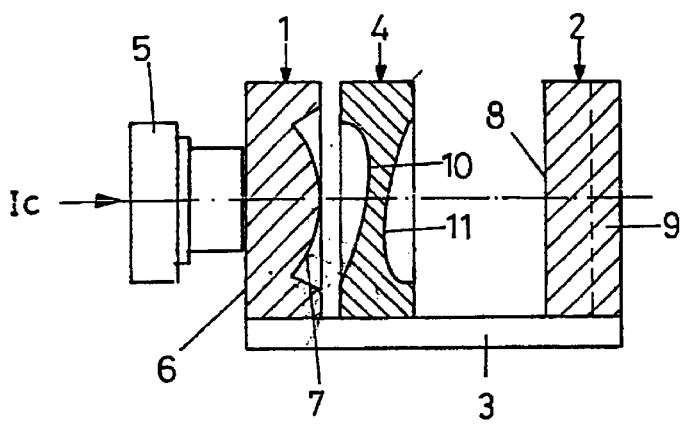
FIG. 1a shows a side view of one embodiment of a imaging system as claimed in the invention.
Figure 1C:
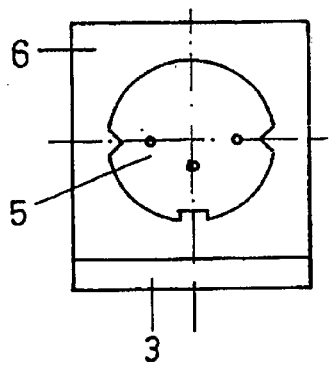
Figure 1B:
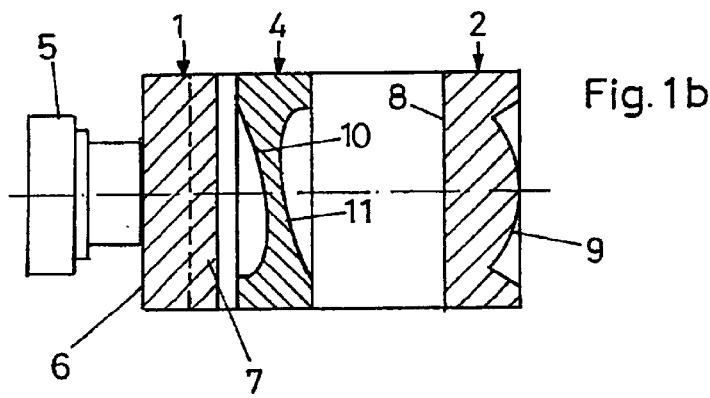

First, reference is made to FIGS. 1a–1c. The embodiment of the imaging system as shown therein includes two lens elements 1, 2 mounted on a carrier 3 essentially parallel to one another and spaced apart from one another. Between the two lens elements is a correction element 4 which is likewise aligned essentially parallel to the two lens elements 1, 2 and mounted on the carrier 3. Light emerging from the laser diode 5 can be focused on a small space sector which is located in FIG. 1a and FIG. 1b in the right-hand part and which corresponds to the entry surface of an optical fiber, for example.

The lens element 1 on the left side in FIGS. 1a and 1b has a planar entry surface 6 and on its right side an optically functional interface 7. Accordingly, the second lens element 2 on its left side has a planar entry surface 8 and on its right side an optically functional interface 9. In the embodiment shown, the first and the second optically functional interface 7, 9 in sections have a cylinder lens geometry. In the embodiment shown the cylinder lens geometry is formed by a cylinder section with a cross section with the shape of a sector. The two cylinder axes of these cylinder sections of the first and second optically functional interfaces 7, 9 are perpendicular to one another in the embodiment shown.

Figure 2:
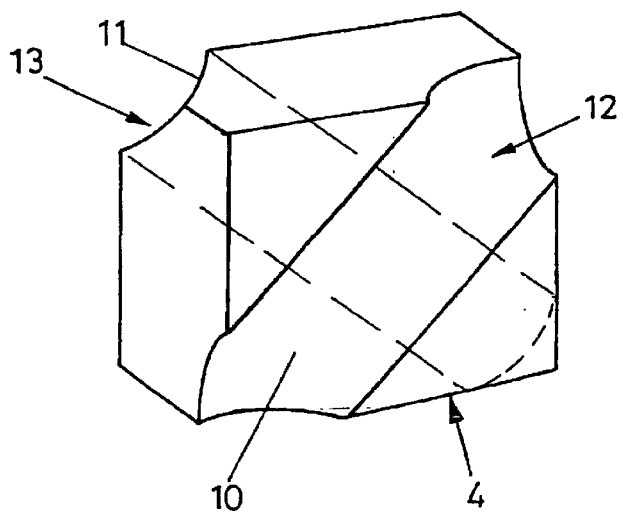
FIG. 2 shows perspective view of a correction element of the imaging system as shown in FIG. 1.

It is possible, instead of the spherical cylinder geometries, to use aspherical cylinder geometries for the first and the second optically functional interface 7, 9. In this way imaging errors formed in imaging with cylinder lenses crossed to one another are effectively compensated. In the embodiment shown, this compensation is furthermore undertaken by the additionally inserted correction element 4 having the third optically functional interfaces 10, 11 including one cylinder section 12, 13 at a time, as is apparent from FIG. 2. These cylinder sections 12, 13 of the optically functional interfaces 10, 11 of the correction element 4 are perpendicular to one another and at an angle of 45° to the cylinder axes of the optically functional interfaces 7, 9. It is possible to provide the optically functional interfaces 10, 11 of the correction element 4 with a spherical or aspherical cylinder lens geometry. For example elliptical, hyperbolic or parabolic cylinder geometries can be used as aspherical geometries.

Figure 3A:
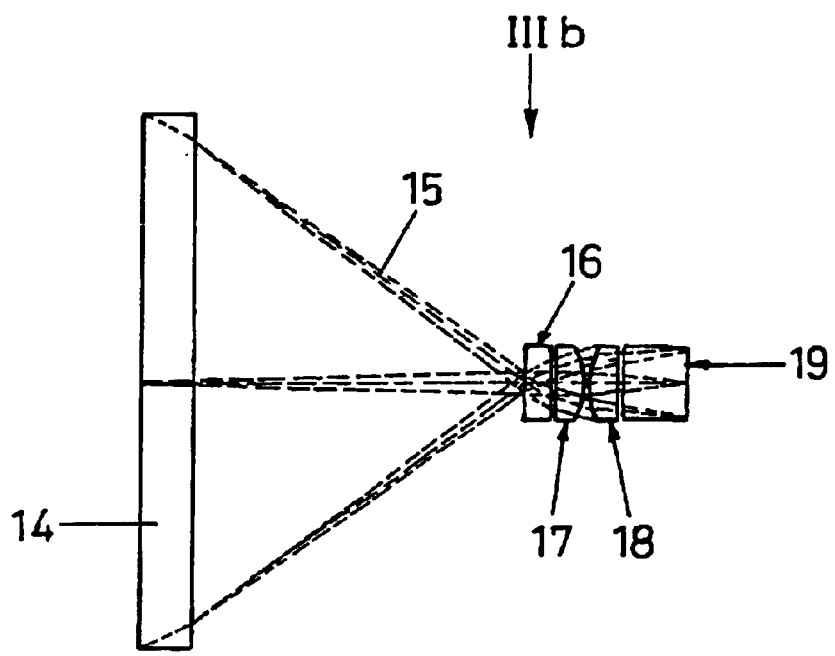
FIG. 3a shows a schematic of another embodiment of the imaging system as claimed in the invention.

FIG. 3a shows one embodiment of the imaging system which can be used as the objective lens. Here the light 15 emerging from the object 14, after passing through an aperture diaphragm 16, is imaged by two lens elements 17, 18 followed by one correction element 19 in the imaged embodiment. The light emerging from the correction element 19 in FIG. 3a on the right side can, for example, strike a CCD sensor element or CMOS sensor element.

Figure 3B:
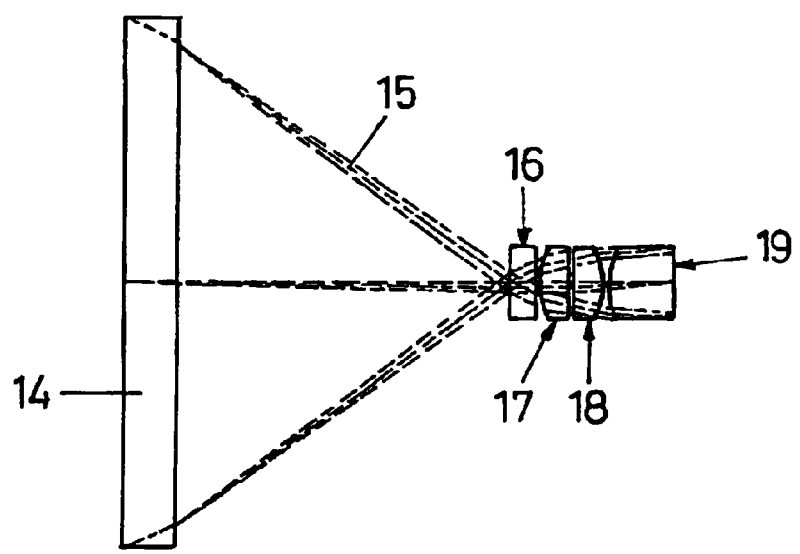

In the embodiment shown in FIG. 3b, each of the lens elements 17, 18 both on its entry and also its exit side has an optically functional interface with a cylinder lens geometry or cylinder lens-like geometry. As in the embodiment shown in FIGS. 1a–1c and FIG. 2, this cylinder lens geometry or cylinder lens-like geometry can be chosen as a spherical or aspherical cylinder lens geometry. In the embodiment shown the two optically functional interfaces of each of the lens elements 17, 18 are each provided with cylinder lens geometries which are perpendicular to one another. Furthermore, in the embodiment shown the correction element 19 is provided with an optically functional interface with a cylinder lens geometry only on its entry surface. On its exit surface the correction element 19 is planar in the embodiment shown.

As shown in the invention it is possible to combine the imaging systems shown in FIG. 3, for example, which consist of two lens elements 17, 18 and optionally a correction element 19 and optionally an aperture diaphragm 16 into lines or arrays so that they can be assigned to linear lines of camera sensors or two-dimensional fields of camera sensors.

What is claimed is:

1. An imaging system for imaging electromagnetic radiation in an optical spectral range, comprising at least one lens element and at least one first and one second optical functional interfaces through which the electromagnetic radiation can pass, the at least one first and the at least one second optical functional interfaces having, at least in sections, a cylinder lens geometry or a cylinder lens-like geometry, the at least first and the at least one second optical functional interfaces each have a cylinder axis, the cylinder axis of the at least one first optical functional interface to the cylinder axis of the at least one second optical functional interface being aligned substantially perpendicular to one another, at least one additional correction element with two third optically functional interfaces opposite one another, having, at least in sections, a cylinder lens geometry or a cylinder lens-like geometry so that the two third optically functional interfaces each have a cylinder axis with the cylinder axes of the two third optically functional interfaces being aligned substantially perpendicular to one another and at an angle of substantially 45° to the cylinder axes of the at least one first and the at least one second optically functional interfaces.

2. The imaging system as claimed in claim 1, wherein the aspherical cylinder lens geometry or the aspherical cylinder lens-like geometry is formed by an elliptical, hyperbolic or parabolic cylinder section.

3. The imaging system as claimed in claim 1, wherein there are at least two lens elements, on one of the lens elements there being a first optically functional interface and on the other of the lens elements there being a second optically functional interface.

4. The imaging system as claimed in claim 3, wherein the at least one additional correction element is positioned between the two lens elements.

5. The imaging system as claimed in claim 1, wherein the at least two lens elements each comprise one of the first or second optically functional interfaces and a planar entry or an exit surface opposite the interfaces.

6. The imaging system as claimed in claim 1, wherein the at least one third optically functional interface is concave.

7. The imaging system as claimed in claim 1, wherein the at least one third optically functional interface has a spherical or aspherical cylinder lens geometry or cylinder lens-like geometry.

8. The imaging system as claimed in claim 7, wherein the aspherical cylinder lens geometry or the cylinder lens-like geometry of the at least one third optically functional interface is formed by an elliptical, hyperbolic or parabolic cylinder section.

9. The imaging system as claimed in claim 1, wherein the are at least one lens element and the at least one correction element are on a common carrier.

10. The imaging system as claimed in claim 1, wherein the at least one lens elements are arrays or linear lines of identical lens elements.

11. The imaging system as claimed in claim 1, wherein the at least one correction elements are arrays or linear lines of identical correction elements.

12. An objective lens comprising an imaging system as claimed in claim 1.

13. A sensor comprising an imaging system as claimed in claim 1.

14. A camera comprising an imaging system as claimed in claim 1.

15. The imaging system as claimed in claim 1, wherein the at least one first, or the at least one second optical functional interface, or both, have an aspherical cylinder lens geometry, or an aspherical cylinder lens-like geometry.

* * * * *